(No Model.)
G. W. BILLINGS & B. P. KENYON
OIL TANK FOR VAPOR STOVES.
No. 464,953. Patented Dec. 15, 1891.
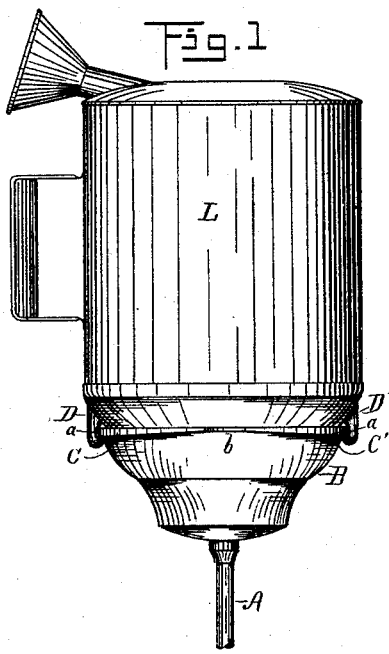
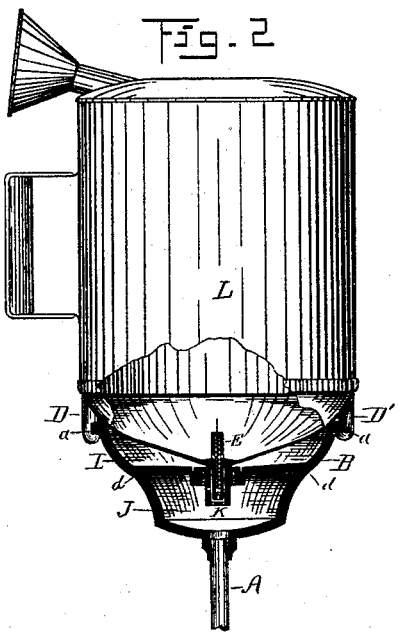
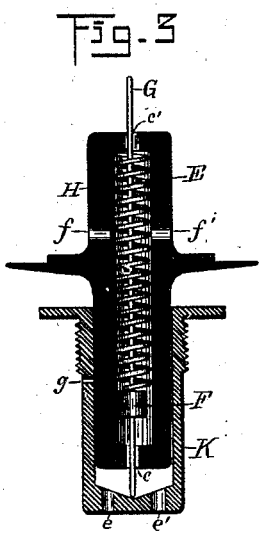
Witnesses:
W. A. Biddle
F. Griswold
Inventors:
G. W. Billings
B. P. Kenyon
By W. H. Burrows
Atty.

UNITED STATES PATENT OFFICE.

GEORGE W. BILLINGS AND BERTRAND P. KENYON, OF CLEVELAND, OHIO.

OIL-TANK FOR VAPOR-STOVES.

SPECIFICATION forming part of Letters Patent No. 464,953, dated December 15, 1891.

Application filed March 5, 1890. Serial No. 342,793. (No model.)

*To all whom it may concern:*

Be it known that we, GEORGE W. BILLINGS and BERTRAND P. KENYON, citizens of the United States, residing at Cleveland, county of Cuyahoga, and State of Ohio, have invented new and useful Improvements in Safety Oil-Tanks for Vapor-Stoves, of which the following is a specification.

The nature of our invention relates to a removable safety-tank for vapor-stoves, the mode of connecting said tank with the stove, and the valve mechanism in connection with said tank, as hereinafter fully explained and set forth.

That the invention may be fully seen and understood, reference will be had to the following specification and annexed drawings.

Figure 1 is a view of the tank attached to the supply-pipe. Fig. 2 is a partial sectional view of the tank and devices connected therewith. Fig. 3 is an enlarged view of the valve-and-socket mechanism.

Like letters of reference refer to like parts in the specification and drawings.

In the drawings, A represents the upper terminal of the supply. The lower end thereof is to be extended to form a connection with a vapor-stove. The said upper terminal of the pipe A is attached to a bowl B, Figs. 1 and 2, having around its upper edge a section of screw C C'. On each side, as shown in the drawings, secured to the tank, are two lugs D D' on opposite sides. Said lugs are grooved at $a$ $a$ for admission therein of the screw-sections C C'. The tank is made fast to the bowl B by means of the lugs and screw-sections by causing the lugs to slip through the notches or openings in the sectional screw on each side of the bowl, one of which is shown at $b$, Fig. 1. The tank is then turned to the right or left, by which the sectional screws are engaged in the grooves $a$ $a$ of the lugs, and, as the screws are made tapering, as shown in Fig. 1, the turning of the tank causes it to be brought in close and firm contaction with the bowl by the action jointly of the screw-sections and lugs, as described.

To the lower extremity of the tank is attached a hollow stem E, Figs. 2 and 3, having in the interior a valve F, (best shown in Fig. 3,) to which stem is attached the valve-rod G. The terminals of said rod extend through openings $c$ $c'$ in the ends of the hollow stem E. Inclosing or surrounding the rod G, above the valve F, is a spiral spring H, the resiliency of which causes the valve F to close the opening $c$ in the lower end of the stem E, the ends of the spring being in contact with upper face of the valve and upper end of the stem-cavity, as seen in Fig. 3, to insure the required action of the spring.

As shown in the drawings, the bowl B consists of duplex compartments I and J, Fig. 2, separated by the diaphragm $d$ and preferably an integral part of the bowl, in the center of which diaphragm is threaded a socket K. Into this socket the stem E, containing the valve F and spring H, is inserted when the tank is secured to the bowl, Figs. 2 and 3. It will be seen that the rod G, protruding from the opening $c$ in the stem E, will come in contact with the base of the socket-cavity when the stem E is firmly seated in said socket, thus allowing the oil to pass out of the stem E by raising the valve F and opening the hole $c$. The oil, which passes from the tank L into the stem E through the openings $f$ $f'$, can then pass down through the compartment J, from whence it passes into and through the supply A.

The compartment J is rendered air-tight by the fitting of the stem E into the socket K by means of a grooved joint. Hence the overflow of oil is forced back from the supply-pipe, which is caused in several ways. For illustration, suppose that the stove has been in use for several hours and the pipes and appendages are all heated up. If the supply is turned off and the tank removed to be refilled, the expansion of the heated pipes and appendages will cause the oil to be forced back up the supply-pipe. This overflow is then deposited in the compartment J. Or suppose that the oil has been turned on at the tank and lighted in the firing-cup. The tank then being removed for refilling, the generation of gas or vapor going on in the burner will force the oil back up the supply-pipe, and the overflow thereby caused will be deposited in the compartment J and does not rise into the compartment I, the compartment J being air-tight when the tank is in position and the overflow therein above the base of the socket K, in which are the holes $e$ $e'$. Now if the tank L were disconnected from the bowl B the oil would rise up through the socket K into the compartment I, which is avoided by a vent-hole $g$ in the socket. (Seen in Fig. 3.) When the tank is disconnected, air is admitted to the compartment through said vent-hole $g$ at or near the roof or diaphragm of the compartment J, as herein set forth.

What we claim for Letters Patent is—

1. In an oil-tank for vapor-stoves, the combination of a supply-pipe, and a bowl B, divided into duplex compartments by a diaphragm and having in the center of said diaphragm firmly seated the socket K, with a vent-hole therein and one or more openings in the lower terminal thereof, substantially as described.

2. The combination, with a safety oil-tank, of two compartments below said tank, with an interposed diaphragm, the lower compartment thereof rendered air-tight by the stem E, extending from the tank and fitting into the socket K, depending from the diaphragm into the lower compartment, provided with a connection for the supply-pipe, substantially as herein described.

3. In a vapor-stove, the combination of the supply-pipe, the tank L, a stem E, attached to the bottom of said tank and having a valve-stem and spring therein, and bowl B, having two compartments, with a socket K firmly seated in the interposed diaphragm, arranged for conjoint operation with said valve-stem, in the manner and substantially for the purpose specified.

In testimony whereof we affix our signatures in presence of two witnesses.

GEORGE W. BILLINGS.
BERTRAND P. KENYON.

Witnesses:
WALTER H. BIDDLE,
L. F. GRISWOLD.